Patented Apr. 1, 1924.

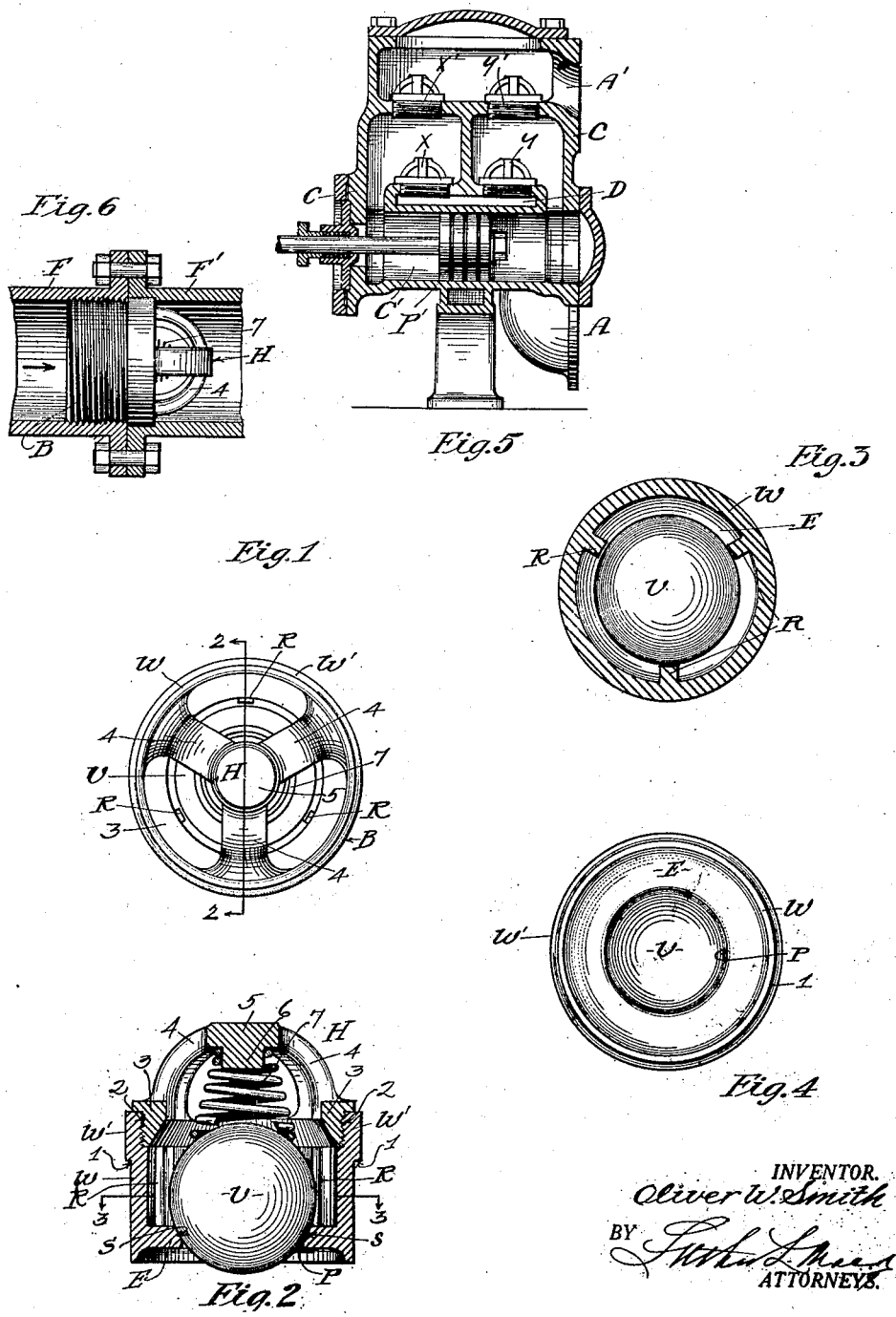

1,488,799

UNITED STATES PATENT OFFICE.

OLIVER W. SMITH, OF LOS ANGELES, CALIFORNIA.

VALVE.

Application filed April 19, 1921. Serial No. 462,747.

*To all whom it may concern:*

Be it known that I, OLIVER W. SMITH, a citizen of the United States, and a resident of Los Angeles, in the county of Los Angeles and State of California, have invented new and useful Improvements in Valves, of which the following is a specification.

This invention relates to valves, and particularly to a form of valve adapted for use in connection with a water pump, and also as a check in a water supply line. The main object of my invention is to provide in a valve of the character and for the purposes stated, a structure of simple character, easily attachable for use to a pump or pipe line, and having sufficient strength to withstand pressure to which it may be subject in use.

A subsidiary object is to provide a valve having a body and a skeleton head detachably held thereon, a valve seat being provided in said body and a spherical valve loosely held therein, adapted to normally engage said seat. Other objects may appear as the description progresses;

I have shown one practical embodiment of my invention in the accompanying drawing, in which:

Fig. 1 is a top plan view.

Fig. 2 is a sectional elevation of the same, on line 2—2.

Fig. 3 is a sectional plan on line 3—3 of Fig. 2.

Fig. 4 is a bottom plan view.

Fig. 5 is a section of the water end of a steam pump, showing my valves attached thereto for use.

Fig. 6 is a view of my valve applied to a pipe line for use as an ordinary check valve.

A preferred form of structure and arrangement of part, as illustrated in the drawing, includes a cup-like body B having a horizontal end closure E at the bottom, and a circular wall W of integral charaacter. The end E has a passage P concentrically formed therein, the inner portion of which is tapered to provide a valve seat S. The wall W may be externally threaded or not, depending upon the requirements for adapting the same to attachment to a pump casing and the upper end thereof has an enlargement W' with a shoulder 1 at the bottom edge thereof, which is adapted to abut a wall of the pump casing when a valve is placed in position therein. On the interior of the wall W I provide a plurality of vertical ribs R, R, etc., between which a ball valve B of substantial dimensions is adapted to be movably held for engagement with the valve seat S formed in the end E.

The portion W' of the wall of the valve body is internally threaded at 2 and adapted to receive the valve head H which has an annular ring portion 3 at the bottom externally threaded to conform to the portion W', and a plurality of curved arms or ribs 4, 4, etc., extending upwardly from said ring portion and connecting said ring portion with a central portion 5 at the top of the head. A boss 6 depends from the portion 5 of the head and is adapted to receive the upper end of a coil spring, 7. The lower end of said spring engages the ball valve B and said spring is adapted to be compressed between the portion 5 of the head and said valve, when pressure is exerted on the opposite side of the valve for opening the passage P.

Ribs R, R, etc., serve to center the valve V with respect to the valve seat S, enough clearance being provided only, to permit the free movement of the ball valve between said ribs.

As shown in Fig. 5 my valves may be used in connection with a water pump. In this form of pump the pump casing C has a cylinder C' with a piston P' horizontally disposed therein, and the water is displaced by said piston. The water flows to the pump through the suction pipe A at the bottom of the pump and through a passage D to the suction valves X and Y in the wall surrounding the passage D. The water is discharged through the discharge valves X' and Y' at the upper portion of the casing C, to a discharge pipe A' at the top. The operation of the pump is as follows:

The piston P' moving to the left, the suction valve Y lifts and opens, and the discharge valve Y' remains closed and water flows into the right hand end of the cylinder. At the same time the water at the left end of the cylinder flows through the discharge pipe X' which is lifted while the suction valve X remains closed. When the piston moves to the right, the suction valve X opens and the discharge valve X' closes; at the same time the suction valve Y closes and the discharge valve Y' opens. Thus, the pump is arranged to discharge and receive water during both strokes of the piston, and is double acting.

The foregoing description of course, applies to only one well-known form of pump and my valves may be applied to other forms with equally good results.

I may also use my valves as an ordinary check in connection with a pipe line, as shown in Fig. 6, by interposing the valve as shown, between two sections of pipe F and F' so that water may pass through the pipe in the direction indicated, but may not pass in an opposite direction. My valve also may be used for oil and other liquids, and for other purposes not mentioned, with slight modification to meet all requirements.

What I claim is:

A valve of the character described comprising a cylindrical body adapted to be inserted in a casing, and an enlarged portion integral therewith adapted to abut said casing for holding said body in position, and an end portion having a passage therethrough, a plurality of longitudinal ribs being formed on the interior of said body, a ball valve movably disposed between said ribs for closing said passage, a head having an annular ring portion adapted to be threaded into said enlarged body portion, and a skeleton extension projecting outwardly therefrom and having a boss integrally formed therewith, and a coil spring held at one end on said boss and engaging said valve at the other end, and adapted to normally hold said valve closed.

OLIVER W. SMITH.

Witnesses:
J. W. SHEELEY,
IRENE BREEN.